US008705983B2

(12) United States Patent
Logan, Jr. et al.

(10) Patent No.: US 8,705,983 B2
(45) Date of Patent: Apr. 22, 2014

(54) RADIO FREQUENCY OPTICAL COMMUNICATION SYSTEM

(75) Inventors: Ronald T. Logan, Jr., Pasadena, CA (US); Eva Peral, Altadena, CA (US); Patrick J. Cawthorne, Warminster, PA (US); Gustav Witzel, Warminster, PA (US); Frank Weiss, Warminster, PA (US)

(73) Assignee: Emcore Corporation, Albuquerque, NM (US)

( * ) Notice: Subject to any disclaimer, the term of this patent is extended or adjusted under 35 U.S.C. 154(b) by 504 days.

(21) Appl. No.: 13/072,531

(22) Filed: Mar. 25, 2011

(65) Prior Publication Data

US 2012/0243874 A1 Sep. 27, 2012

(51) Int. Cl.
*H04B 10/04* (2006.01)
*H04B 10/06* (2006.01)

(52) U.S. Cl.
USPC ............ 398/198; 398/208; 398/212; 398/213

(58) Field of Classification Search
USPC .................................. 398/213, 198, 208, 212
See application file for complete search history.

(56) References Cited

U.S. PATENT DOCUMENTS

| 5,526,158 A | * | 6/1996 | Lembo | 398/204 |
| 5,532,857 A | | 7/1996 | Gertel et al. | |
| 5,909,523 A | * | 6/1999 | Sakaino et al. | 385/49 |
| 6,043,922 A | * | 3/2000 | Koga et al. | 398/213 |
| 7,826,752 B1 | * | 11/2010 | Zanoni et al. | 398/205 |
| 2002/0015208 A1 | * | 2/2002 | Logan et al. | 359/161 |

OTHER PUBLICATIONS

Sisto, M.M. et al., "Gain Optimization by Modulator-Bias Control in Radio-Over-Fiber Links." Journal of Lightwave Technology, vol. 24, No. 12, pp. 4974-4982. Dec. 2006.*
Korotky, S., et al., "Dual Parallel Modulation Schemes for Low-Distortion Analog Optical Transmission." IEEE Journal on Selected Areas in Communications, vol. 8, No. 7, pp. 1377-1381. Sep. 1990.
Brooks, J., et al., "Implementation and Evaluation of a Dual Parallel Linearization System for AM-SCM Video Transmission." Journal of Lightwave Technology, vol. 11, No. 1, pp. 34-41. Jan. 1993.
Farwell, M., et al., "Increased Linear Dynamic Range by Low Biasing the Mach-Zehnder Modulator." IEEE Photonics Technology Letters, vol. 5, No. 7, pp. 779-782. Jul. 1993.
Lagasse, M., et al., "Optical carrier filtering for high dynamic range fibre optic links." Electronics Letters, vol. 30, No. 25, pp. 2157-2158. Dec. 8, 1994.
Bridges, W., et al., "Distortion in Linearized Electrooptic Modulators." IEEE Transactions on Microwave Theory and Techniques, vol. 43, No. 9, pp. 2184-2197. Sep. 1995.

(Continued)

*Primary Examiner* — Daniel Dobson

(57) ABSTRACT

An optical communication system for generating and transmitting a modulated optical signal in which light emitted by a light source is modulated by an optical modulator in accordance with an input electrical signal. A bias signal generator applies a bias electrical signal to bias the optical modulator at a bias angle away from quadrature. The bias signal generator monitors the input electrical signal and adjusts the applied bias electrical signal in dependence on the input electrical signal. The system further includes a receiver which may include an equalizer coupled to the photodetector of the receiver.

21 Claims, 3 Drawing Sheets

(56) References Cited

OTHER PUBLICATIONS

Betts, G., et al., "Semiconductor Laser Sources for Externally Modulated Microwave Analog Links." IEEE Transactions on Microwave Theory and Techniques, vol. 45, No. 8, pp. 1280-1287. Aug. 1997.

Ackerman, E., et al., "Low Noise Figure, Wide Bandwidth Analog Optical Link." Proc. IEEE Int. Top Mtg. Microwave Photonics, pp. 325-328. Oct. 2005.

Karim, A., et al., "Low Noise Figure Microwave Photonic Link." IEEE MTT-S International Microwave Symposium, Jun. 3-8, 2007, p. 1519. Honolulu, HI.

Ackerman, E., et al., "Maximum Dynamic Range Operation of a Microwave External Modulation Fiber-Optic Link." IEEE Transactions on Microwave Theory and Techniques, vol. 41, No. 8, pp. 1299-1306. Aug. 1993.

O'Connor, S., et al., "Wideband Adaptive Feedforward Photonic Link." Journal of Lightwave Technology, vol. 26, No. 15, pp. 2810-2816. Aug. 2008.

Subbaraman, H., et al., "Spurious-Free Dynamic Range (SFDR) improvement in a true-time-delay system based on highly dispersive photonic crystal fiber." IEEE/LEOS Winter Topical Meeting Series on Nanophotonics, Jan. 2009. pp. 58-59.

Roussell, H.V., et al., "Gain, Noise Figure and Bandwidth-Limited Dynamic Range of a Low-Biased External Modulation Link." 2007 IEEE International Topical Meeting on Microwave Photonics. Oct. 2007. pp. 84-87.

Xie, X.B., et al., "Suppressed-Carrier Large-Dynamic-Range Heterodyned Microwave Fiber-Optic Link." 2004 IEEE International Topical Meeting on Microwave Photonics. Oct. 2004. pp. 245-248.

Nichols, L.T., et al., "Optimizing the Ultrawide-Band Photonic Link." IEEE Transactions on Microwave Theory and Techniques, vol. 45, No. 8, pp. 1384-1389. Aug. 1997.

Kostko, I.A., et al., "A radio-over-fiber link for OPFDM transmission without RF amplification." Proc. of 20th LEOS Annual Meeting, Oct. 2007.

Sisto, M.M. et al., "Carrier-to-Noise Ratio Optimization by Modulator Bias Control in Radio-Over-Fiber Links." IEEE Photonics Technology Letters, vol. 18, No. 17, Sep. 2006. pp. 1840-1842.

* cited by examiner

RADIO FREQUENCY OPTICAL COMMUNICATION SYSTEM

GOVERNMENT RIGHTS STATEMENT

This invention was made with government support under a subcontract with Northrop Grumman Corporation. The Government has certain rights in the invention.

BACKGROUND OF THE INVENTION

1. Field of the Invention

The present invention relates to an optical communication system in which an optical beam is modulated in accordance with an electrical RF signal in a transmitter, and the modulated optical beam is then transmitted to a remote receiver.

2. The Background Art

It is known that an optical beam can be modulated in accordance with an electrical RF signal using an optical modulator such as a Mach-Zehnder modulator. Such optical modulators have a nonlinear relationship between the input electrical signal and the output optical signal, but this nonlinear relationship can be mitigated by applying an electrical bias signal to the optical modulator to bias the optical modulator to a quadrature point at which the relationship between the input electrical signal and the output optical signal is approximately linear. Typically, the optical modulator is maintained with a fixed bias at the quadrature point by controlling the electrical bias signal in accordance with the output optical signal.

A problem with biasing an optical modulator at the quadrature point is that the input electrical radio-frequency (RF) signal normally only introduces a small modulation into the output optical signal unless the electrical RF signal is amplified. Such a small modulation is undesirable because a high proportion of the optical signal carries no information. Amplifying the input electrical RF signal increases the proportion of the optical signal which carries information, but the electrical RF amplification is undesirable in that it introduces noise, degrades linearity and introduces amplitude and phase variations across the frequency band of the transmitted RF signals.

In the article "Increased Linear Dynamic Range by Low Biasing the Mach-Zehnder Modulator" by Mark L. Farwell et al., IEEE Photonics Technology Letters, Vol. 5, No. 7, July 1993, pp. 779-782, a "low biasing" scheme is reported in which an optical bias below the conventional quadrature bias is used. Such an arrangement produces a relatively high modulation depth of the optical signal without any amplification of the input electrical RF signal. For single octave applications, a theoretical increase in linear dynamic range under certain conditions is predicted. In the article "Gain Optimization by Modulator-Bias Control in Radio-Over-Fiber Links" by Marco M. Sisto et al., Journal of Lightwave Technology Vol. 24, No. 12, December 2006, pp. 4974-4982, the combination of a low-biased Mach-Zehnder modulator and an Erbium-Doped Fiber Amplifier (EDFA) is discussed.

SUMMARY OF THE INVENTION

One aspect of the present invention provides a transmitter for generating and transmitting a modulated optical signal in which light emitted by a light source is modulated by an optical modulator in accordance with an input RF electrical signal. A bias signal generator applies a bias electrical signal to bias the optical modulator at a bias angle away from quadrature. The bias signal generator monitors the input RF electrical signal and adjusts the applied bias electrical signal in dependence on the amplitude of the input RF electrical signal. In an embodiment, the input RF electrical signal is an information-containing modulated signal which is preferably band-limited with a frequency range of less than one octave.

In an embodiment, the transmitter includes an equalizer for modifying the modulated input RF electrical signal to compensate for frequency variation in the modulation performance of the optical modulator.

The bias signal generator may be arranged to adjust the applied bias signal such that the bias angle decreases as the modulator efficiency increases. In an embodiment, this is achieved by including an electrical component coupled to the modulator for introducing a loss into the electrical signal input to the modulator.

The transmitter may include an optical amplifier coupled to the input and/or output of the optical modulator for amplifying the modulated light output by the optical modulator.

Another aspect of the present invention provides a receiver for receiving and detecting a modulated optical signal from a remote transmitter. The receiver includes a control signal generator which monitors and processes a received modulated optical signal to generate a control signal indicative of the strength of modulation of the modulated optical signal. An optical preamplifier amplifies the received modulated optical signal, with the amount of amplification depending on the control signal, and the amplified modulated optical signal is converted into a corresponding modulated electrical signal by a detector.

In an embodiment, the receiver includes an equalizer coupled to the detector for modifying the modulated electrical signal.

A further aspect of the invention provides an RF optical communication system in which a transmitter transmits a modulated optical signal along an optical path to a receiver. The optical path may be in free-space, in optical fiber, in an integrated optical waveguide, underwater, or through some other media. The transmitter includes an equalizer which modifies a received modulated electrical signal. An optical modulator modulates light emitted by a light source in accordance with the modified electrical signal, the optical modulator being biased away from quadrature. The receiver includes an optical preamplifier which amplifies received modulated light prior to conversion to a corresponding electrical signal by a detector. An equalizer modifies the detected electrical signal to compensate for the modification of the modulated electrical signal by the optical modulator.

In an embodiment, the equalizer in the transmitter is arranged to compensate for frequency variation in the modulation performance of the optical modulator.

A further aspect of the invention provides a method of generating and transmitting a modulated optical signal in which an optical modulator modulates light in accordance with an input information-containing electrical signal. The method comprises monitoring the received electrical signal, generating a bias electrical signal in dependence on the received electrical signal, and applying the generated bias electrical signal to the optical modulator to bias the optical modulator at a bias angle away from quadrature.

Another aspect of the invention provides a method of receiving and detecting a modulated optical signal from a remote transmitter. The method comprises monitoring and processing a received modulated optical signal to generate a control signal indicative of the strength of modulation of the modulated optical signal, amplifying the received modulated optical signal in dependence on the control signal, and converting the amplified modulated optical signal into a corresponding modulated RF electrical output signal. In an embodiment, the method further comprises inputting the RF modulated electrical output signal into an equalizer which modifies the modulated electrical signal.

A further aspect of the invention provides a method of operating an RF optical communication link in which a transmitter receives an input RF modulated electrical signal, modifies the modulated electrical signal using an equalizer to generate a modified electrical signal, and modulates a light beam in accordance with the modified electrical signal using an optical modulator biased away from quadrature. The modulated light beam is amplified and transmitted along an optical path. Following transmission through the optical path, a receiver receives the modulated light beam and amplifies the received modulated light beam. The amplified light beam is converted into a corresponding electrical signal, which is then modified to take account of the modification of the electrical signal by the optical link, thereby producing an output RF electrical signal. The equalizer in the transmitter may compensate for frequency variation in the modulation performance of the optical modulator.

DESCRIPTION OF THE PREFERRED EMBODIMENT

Figure 1:
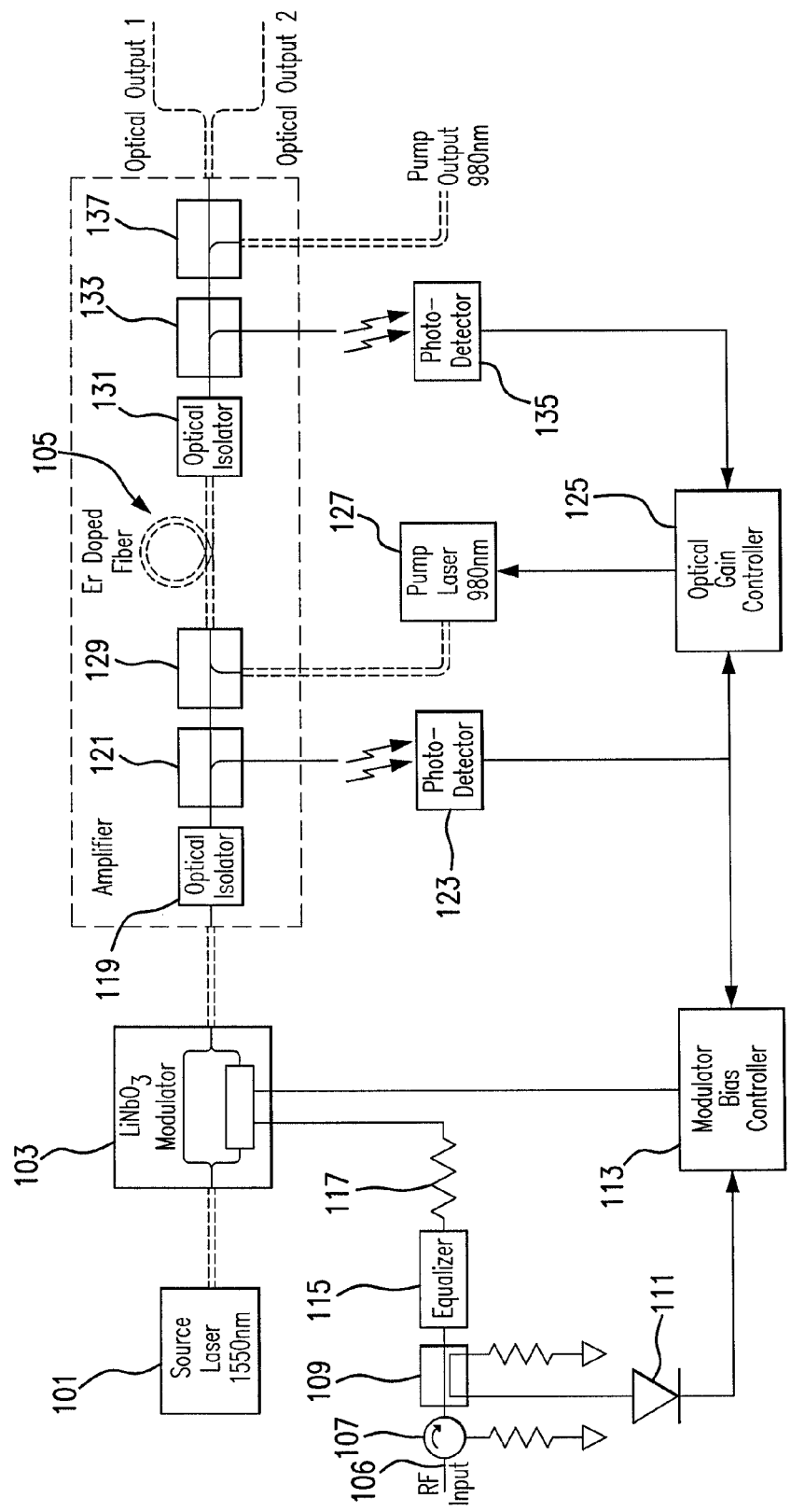
FIG. 1 is a block diagram schematically showing the main components of a transmitter forming part of a RF optical communication link.

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments nor the relative dimensions of the depicted elements, and are not drawn to scale.

FIG. 1 shows the main components of a transmitter forming part of an RF optical communication link in which light emitted by a source laser 101 at 1550 nm is modulated by a lithium niobate (LiNbO$_3$) modulator 103 and amplified using an Erbium-doped fiber 105 prior to transmission. In this embodiment, the source laser 101 and the LiNbO$_3$ modulator are packaged in a single integral housing with the output power of the single-longitudinal-mode source laser 101 being approximately 63 mW at a wavelength in the 1550 nm telecommunications band from 1535 to 1565 nm, and the LiNbO$_3$ modulator 103 being arranged in a Mach-Zehnder configuration with a V$_\pi$ of 9.6V.

The transmitter receives an input electrical signal 106 modulated at radio frequencies so as to convey information for transmission by the transmitter. In this embodiment, the input electrical signal 106 is band-limited and has a frequency range that is less than one octave. The electrical signal 106 passes, via a circulator 107, to a splitter 109 which directs one percent of the electrical signal 106, via a diode, to a modulator bias controller 113. The remaining ninety-nine percent of the electrical signal passes through an equalizer 115 and the output of the equalizer passes through an optional loss element 117. The output of the loss element 117 (if used) is input to the optical modulator 103 together with a bias electrical signal output by the modulator bias controller 113.

The optical modulator 103 modulates the light emitted by the source laser 101 in dependence on the input RF electrical signal and bias electrical signal, and the resultant modulated light beam is input to the Er-doped fiber amplifier via an optical isolator 119. An optical beam splitter 121 splits off a small proportion of the modulated light beam for detection by a photodetector 123. The signal output by the photodetector 123 is input to the modulator bias controller 113 and an optical gain controller 125, which controls the output of a 980 nm pump laser 127 for the Er-doped fiber amplifier. More than one pump laser may be used to achieve higher output power, and may include wavelengths other than 980 nm. Also, amplifying fiber types other than Er-doped fiber could be employed, with appropriate pump lasers.

The modulated light beam and the 980 nm pump laser beam are combined in an optical multiplexer 129, and then input to the Er-doped fiber 105 which amplifies the modulated light beam. In this embodiment, the optical amplifier introduces 12 dB of gain. The amplified light beam passes through an optical isolator 131 to a beam splitter 133, which splits off a small proportion of the amplified light beam for detection by a photodetector 135. The electrical signal output by the photodetector 135 is input to the optical gain controller 125. The remainder of the amplified 1550 nm signal light beam is input to a second optical multiplexer 137 which removes any unabsorbed 980 nm pump light and passes the 1550 nm optical signal to the output of the optical link. In FIG. 1, a subsequent optical splitter is shown that divides the output signal light into two nearly-equal output signals.

Figure 2:
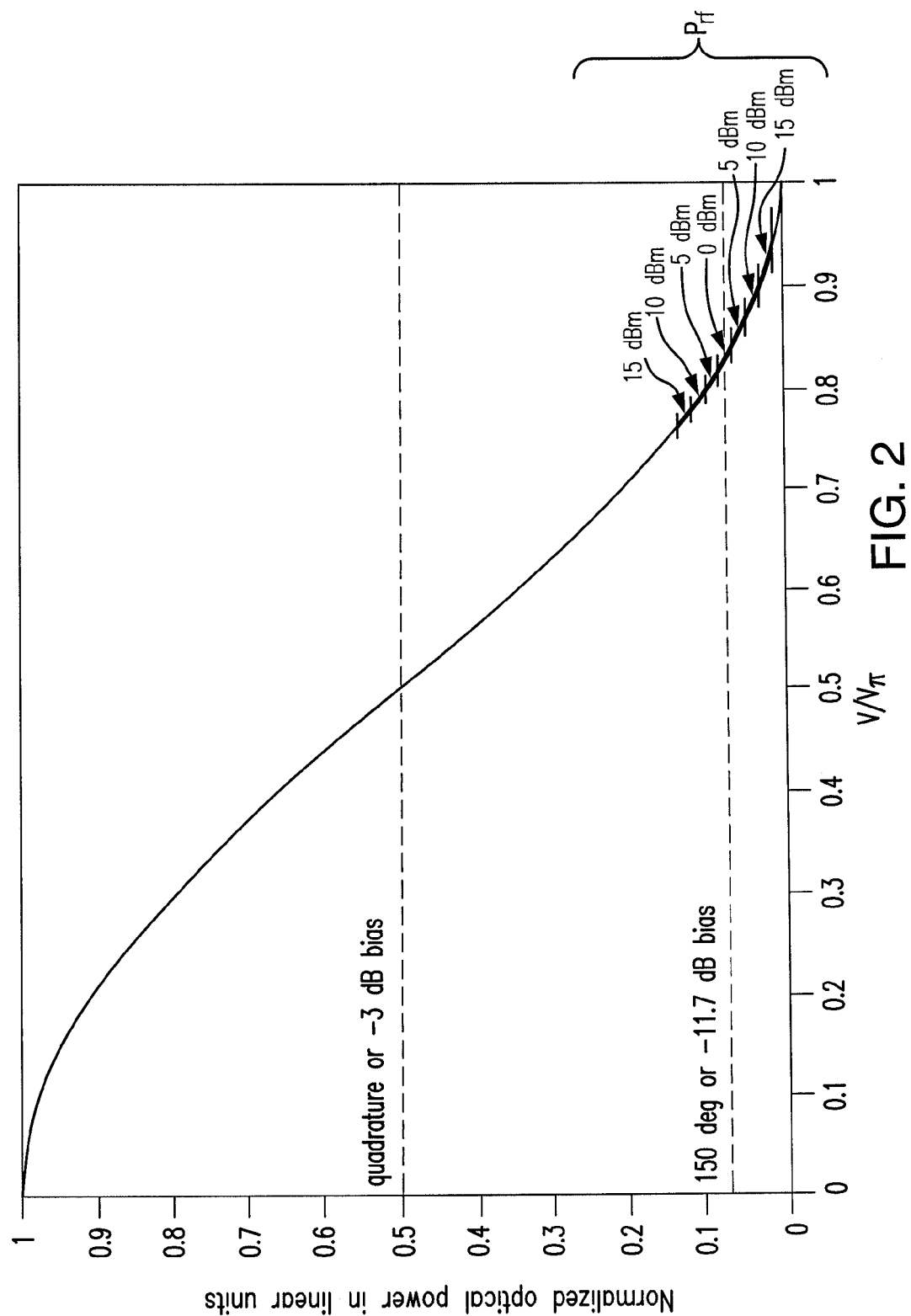
FIG. 2 is a graph showing the modulation performance of an optical modulator forming part of the RF optical communication link illustrated in FIG. 1.

FIG. 2 shows the normalized output power of the optical modulator 103 as a function of the input electrical signal. At quadrature (corresponding to a 90 degrees bias angle typical of most prior-art fiber-optic links), the output power is half the input power and the variation in output optical power with input electrical voltage is approximately linear around this point. In the present invention, the optical modulator 103 is "low-biased" at −11.7 dB bias (corresponding to a 150 degrees bias angle) at which the variation in optical output power with input electrical voltage is nonlinear. This introduces components into the optical signal output by the optical modulator 103 at harmonic frequencies that are primarily even-order multiples of the fundamental input RF electrical signal frequency, f, i.e., 2 f, 4 f, 6 f, etc. However, as will be described hereafter, given that the input RF electrical signal has a frequency range of less than an octave, these harmonic frequencies can be filtered out at the receiver. The third-order linearity of the link is not adversely affected by the change in bias point from quadrature.

Two important benefits arise from using a low-bias modulation scheme, namely:

the optical carrier relative to the RF signal sidebands is suppressed, resulting in enhanced optical modulation depth for a given RF electrical input signal amplitude; and due to a nonlinear effect in the photodiode, the third-order linearity of the link increases.

A problem associated with low-biasing the optical modulator 103 is that at a given biasing the output power of the optical modulator 103 varies with the amplitude of the input electrical signal 106. This does not occur when the modulator is biased at quadrature, since the excursion of the optical output power around the quadrature bias point is purely symmetric, and so the average output power is unaffected by the RF input signal amplitude. However, with low-biasing, the non-symmetric transfer function gives rise to changes in the average optical output power as the amplitude of the RF electrical input signal is varied. Accordingly, the known technique of monitoring the output optical power of a quadrature-biased modulator to compensate for drift in the bias condition is not effective in the low-biasing regime. To address this problem, in this embodiment the amplitude of the input electrical signal is monitored in the modulator bias controller 113 in addition to the optical signal output by the optical modulator 103. The variation in the average optical output power as a function of input electrical signal amplitude may be analytically derived for a Mach-Zehnder modulator using the well-known Bessel function expansion, and this transfer function forms the basis for the design of the modulator bias controller so that the proper modulator bias point is maintained over the expected range of input RF electrical signal amplitudes.

Another problem with the optical modulator 103 is that the modulation performance of the optical modulator 103, that is the variation in output optical power with input electrical voltage, varies with frequency. In this embodiment, this problem is addressed by the equalizer 115 introducing a frequency-dependent variation into the electrical signal 106 to compensate for frequency variation in the modulation performance of the optical modulator 103.

The one-decibel compression point ($P_{1\,dB}$) for the optical modulator 103 is a function of $V_\pi$. In this embodiment, an improvement in the one-decibel compression point is achieved by operating the modulator bias control loop in accordance with a $V_\pi$ of 9.6V, but adding the loss element 117 (in this embodiment 0.68 dB) at the modulator input. As a result, the bias angle of the optical modulator 103 is not held constant but rather decreases slightly as the input electrical signal amplitude increases.

Figure 3:
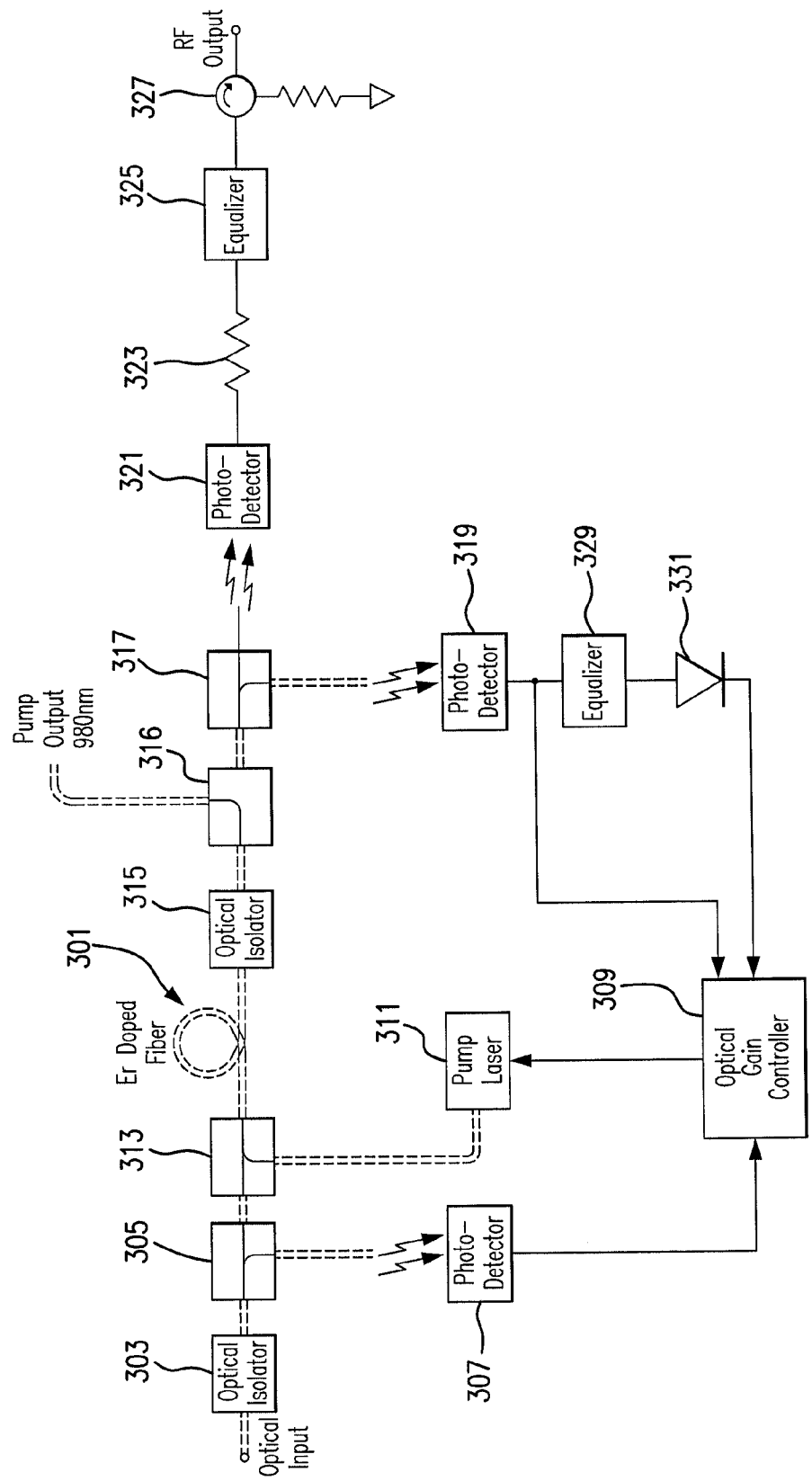
FIG. 3 is a block diagram schematically showing the main components of a receiver forming part of the RF optical communication link.

FIG. 3 shows the main components of the receiver at the other end of the RF optical communication link to the transmitter illustrated in FIG. 1. As shown, in this embodiment the input optical signal is amplified using an Er-doped optical fiber 301 prior to detection. In more detail, the received optical signal passes through an optical isolator 303 and then an optical splitter 305 which splits off a small proportion of the optical signal for detection by a photodetector 307. The electrical signal output by the photodetector 307 is input to an optical gain controller 309 which controls the power output by a 980 nm pump laser 311. The remainder of the optical signal output by the optical splitter 305 is combined with the 980 nm pump beam output by the pump laser 311 in a multiplexer 313, and the combined optical signal is input into the Er-doped fiber 301 for amplification.

The amplified optical signal output by the Er-doped fiber amplifier 301 passes through an optical isolator 315 and then through a second optical multiplexer 316 to remove any unabsorbed 980 nm light before passing through an optical splitter 317 which splits off a small proportion of the amplified optical signal for detection by a second photodetector 319. The remainder of the optical signal is detected by a third photodetector 321, and then passes through a loss element 323 and an equalizer 325, which modifies the input electrical signal to compensate for the frequency response of the third photodetector 321. The electrical signal output by the equalizer 325 passes through a circulator 327 to an RF output.

The electrical signal output by the photodetector 319 is input to the optical gain controller 309 and an equalizer 329, which modifies the input electrical signal to compensate for the frequency response of the second photodiode 319. The electrical signal output by the equalizer 329 passes through a microwave diode 331, and is then input to the optical gain controller 309. The optical gain controller 309 processes the electrical signals directly from the second photodetector 319 and from the microwave diode 331 to determine the ratio between the RF power and optical carrier power (in other words, the modulated portion and the un-modulated portion) of the input optical signal. As both the RF power and the optical carrier power undergo the same optical gain and loss, the ratio is a function of only the RF input power. The optical gain controller 309 then sets the output power for the pump laser 311 in dependence on the determined ratio and the input optical power. This allows a constant RF gain to be maintained for the RF optical communication link over a range of optical losses that might be encountered by the signal while transiting the optical path between the transmitter optical output and the receiver optical input.

In this embodiment, the third photodetector is a photodiode. When using a conventional quadrature-biased modulator in the transmitter, the third-order intercept point (IIP3) is relatively insensitive to the received photocurrent in the photodiode of the receiver. In contrast, the use of a low-biased modulator 103 results in a significant variation in the third-order intercept point (IIP3) with the received photocurrent. In particular, for the case when two tones at frequencies $f_1$ and $f_2$ are present in the input electrical signal, the second-order non-linearity of the low-biased modulator introduces a component at the frequency $f_3=f_2-f_1$. The second-order non-linearity of the photodiode results in power being created at $f_3+f_2$ (i.e. $2f_2-f_1$) and $f_1-f_3$ (i.e. $2f_1-f_2$). This power falls on the third order non-linearity products of the optical modulator 103, and adds coherently such that it will either add or subtract onto the third order non-linearity products of the optical modulator 103. As the second-order non-linearity of the photodiode is highly dependent on photocurrent, the IIP3 point of the link also becomes dependent on photocurrent. Experimental testing has indicated that the IIP3 point has a maximum for a given photocurrent which does not vary significantly with frequency. Accordingly, in this embodiment, the third photodetector 321 is a photodiode having a bias voltage set so that the IIP3 point of the link is substantially at this maximum.

In the described embodiment there are no electrical RF amplifiers, but the RF end-to-end insertion loss of the link is greatly improved compared to quadrature-biased link operated with the same optical power on the photodiode, due to the increase in the optical modulation depth. This improves the amplitude and phase response flatness of the RF optical communication link compared to previous quadrature biased links that required RF amplifiers to achieve comparable RF insertion loss and noise figure.

MODIFICATIONS AND FURTHER EMBODIMENTS

In the receiver illustrated in FIG. 3, the optical signal output by the erbium-doped fiber amplifier 301 is detected by two photodiodes, each having an associated equalizer. In an alternative implementation, not illustrated, one photodiode and equalizer could be employed and the electrical signal split with a portion forming the output and the remainder being fed to the microwave diode 331 to form the error signal for the optical gain controller 309. In particular, the optical splitter 317, the second photodetector 319 and the equalizer 329 in FIG. 3 could be removed, with a portion of the signal detected by the photodetector 321 being input to the optical gain controller 309 and an RF coupler being added between the equalizer 325 and the circulator 327 to couple a portion of the signal output by the equalizer 325 into the microwave diode 331. However, the implementation shown in FIG. 3, while likely more expensive to implement, will yield the highest possible signal fidelity for the end-to-end link. In lower-fidelity systems, the single-photodiode solution may suffice and therefore would be more practical from a cost standpoint.

In the embodiment described above, the output power of the source laser is 63 mW and an erbium-doped fiber amplifier is used in the transmitter to amplify the signal output by the optical modulator. In an alternative embodiment, the output power of the source laser is increased to above 100 mW or more, so that the amplification requirement for the erbium-doped fiber amplifier is reduced. The optical power output by the source laser does, however, need to comply with the maximum input optical power for the optical modulator. For example, the maximum sustained input optical power for currently-available Avanex Ti-diffused modulators is 100 mW.

In another alternative embodiment, which anticipates the future availability of optical modulators with increased power-handling capability, the optical power of the source laser is increased to 500 mW or more. At such a high optical power, the erbium-doped fiber amplifier in the transmitter is unnecessary. The transmitter noise figure is then dependent purely on the noise of the source laser, and the overall link noise figure improves.

The illustrated embodiment uses a $LiNbO_3$ modulator with a Mach-Zehnder configuration. It will be appreciated that other types of optical modulators could be used to modulate the light beam, and could be fabricated in bulk or integrated optical form from other materials such as Si, InP, GaAs or other semiconductors, polymers, optical crystals, carbon nanotube or graphene structures, or other materials.

The illustrated embodiment operates at a wavelength of 1550 nm, i.e. in the third telecommunications window. It will be appreciated that other optical wavelengths could be used, for example around 800 nm or around 1300 nm for use in fiber-optic networks, whereas other wavelengths in the mid-IR would be more appropriate for atmospheric free-space transmission and in the visible green region for undersea transmission, to illustrate just a few possible examples. The terms optical and light are not intended to be restricted to visible wavelengths, and in particular extend into the infrared.

While the present disclosure illustrates and describes an optical communication system, it is not intended to be limited to the details shown, since various modifications and structural changes may be made without departing in any way from the spirit of the present disclosure.

It will be understood that each of the elements described above, or two or more together, also may find a useful application in other types of constructions differing from the types described above. In particular, certain configurations presented according to particular aspects of the present invention have been shown and described as discrete elements, i.e., lasers, splitters, combiners, mirrors, lenses, modulators, equalizers, shifters, fiber optical cable, etc. Those skilled in the art will readily appreciate that many or all of these individual, discrete components may be fabricated and/or packaged into integrated elements. By way of particular example, the use of integrated waveguides and associated structures is envisioned for the described structures and arrangements. Alternatively, the discrete elements, i.e., lasers, splitters, combiners, mirrors, lenses, shifters, etc. may also be individually-packaged in modules with optical fiber interconnects to achieve the same topology and functionality.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The foregoing described embodiments depict different components contained within, or connected with, different other components. It is to be understood that such depicted arrangements or architectures are merely exemplary, and that in fact many other arrangements or architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of specific structures, architectures or intermedial components. Likewise, any two components so associated can also be viewed as being "operably connected" or "operably coupled" to each other to achieve the desired functionality.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting.

Without further analysis, from the foregoing others can, by applying current knowledge, readily adapt the disclosed technology for various applications. Such adaptations should and are intended to be comprehended within the meaning and range of equivalence of the following claims.

The invention claimed is:

1. A transmitter for generating and transmitting a modulated optical signal, the transmitter comprising:
   an input for receiving an electrical signal;
   a light source for emitting light;
   an optical modulator for modulating light emitted by the light source in accordance with the received electrical signal; and
   a bias signal generator operable to apply a bias electrical signal to the optical modulator, the bias electrical signal generator being arranged to apply a bias electrical signal which biases the optical modulator at a bias angle away from quadrature,
   wherein the bias signal generator is arranged to monitor the received electrical signal and to adjust the applied bias electrical signal in dependence on the received electrical signal.

2. A transmitter according to claim 1, wherein the electrical signal IS an information containing modulated RF signal.

3. A transmitter according to claim 1, wherein the light source is a laser having an output power over 60 milliwatts.

4. A transmitter according to claim 2, wherein the electrical signal is band-limited and has a frequency range of less than one octave.

5. A transmitter according to claim 1, wherein the light source and the optical modulator are packaged in a single integral housing.

6. A transmitter according to claim 1, wherein the bias signal generator sets the bias angle such that the bias optical power is less than the optical power at quadrature.

7. A transmitter according to claim 2, wherein the modulated RF electrical signal undergoes no electrical amplification in the transmitter.

8. A transmitter according to claim 1, further comprising an equalizer for modifying the modulated electrical signal to compensate for frequency variation in the modulation performance of the optical modulator.

9. A transmitter according to claim 8, wherein the equalizer is arranged so that the optical modulator has a constant $V_\pi$ over a frequency range of interest.

10. A transmitter according to claim 1, wherein the bias signal generator is arranged to adjust the applied bias signal such that the bias angle decreases as modulator efficiency increases.

11. A transmitter according to claim 10, further comprising an electrical component coupled to the modulator for introducing a loss into the electrical signal input to the modulator.

12. A transmitter according to claim 1, further comprising an optical amplifier coupled to the output of the optical modulator for amplifying the modulated light output by the optical modulator.

13. A receiver for reeving and detecting a modulated optical signal from a remote transmitter, the receiver comprising:
   an input for receiving the modulated optical signal;
   a control signal generator for monitoring and processing the received modulated optical signal to generate a control signal indicative of a ratio between RF power and optical carrier power;
   an optical preamplifier for amplifying the received modulated optical signal to generate an amplified modulated optical signal, wherein the amount of said amplification is variable in accordance with the ratio between RF power and optical carrier power; and
   a detector for converting the amplified modulated optical signal into a corresponding modulated electrical signal.

14. A receiver according to claim 13, further comprising an equalizer coupled to the detector for modifying the modulated electrical signal.

15. A receiver according to claim 13, wherein the control signal generator is arranged to generate the control signal in dependence on the modulated electrical signal detected by the detector.

16. A receiver according to claim 13, wherein the input is an optical fiber, and the detector is suitably spaced apart from the input for optimizing the light distribution on the surface of the detector.

17. An optical communication system in which a transmitter transmits a modulated optical signal to a receiver,
   the transmitter comprising:
      an input for receiving an electrical signal modulated at radio frequencies;
      an equalizer operable to modify the modulated electrical signal to generate a modified electrical signal;
      a light source for emitting light;
      an optical modulator for modulating light emitted by the light source in accordance with the modified electrical signal to generate a modulated light beam, the optical modulator being biased at a bias angle away from quadrature;
      an optical amplifier for amplifying the modulated light; and
      an output for outputting the amplified modulated light,
   and the receiver comprising:
      an input for receiving modulated light from the transmitter;
      an optical preamplifier for amplifying the received modulated light;
      a detector for converting the amplified modulated light output by the optical preamplifier into a corresponding detected electrical signal; and
      an equalizer operable to modify the detected electrical signal to compensate for the modification of the modulated electrical signal by the optical communication link.

18. An optical communication system as claimed in claim 17, wherein the equalizer of the transmitter is arranged to compensate for frequency variation in the modulation performance of the optical modulator.

19. An optical communication system as claimed in claim 17, wherein the equalizer is arranged so that the optical modulator has a constant $V_\pi$ over a frequency range of interest.

20. An optical communication system as claimed in claim 17, wherein the receiver further comprises a control signal generator for monitoring and processing the received modulated optical signal to generate a control signal indicative of the strength of modulation of the modulated optical signal,
   wherein the optical preamplifier is arranged to amplify the received modulated optical signal in accordance with the control signal.

21. A receiver as claimed in claim 13, wherein the detector comprises a photodiode biased so that third order non-linearity components in the corresponding modulated electrical signal are substantially at a minimum.

* * * * *